(12) United States Patent
Bryan et al.

(10) Patent No.: US 12,373,599 B2
(45) Date of Patent: Jul. 29, 2025

(54) SENSITIVE DATA DETECTION

(71) Applicant: Sophos Limited, Abingdon (GB)

(72) Inventors: John Brian Bryan, Oxfordshire (GB); Xing Zhang, Oxfordshire (GB)

(73) Assignee: Sophos Limited, Abingdon (GB)

( * ) Notice: Subject to any disclaimer, the term of this patent is extended or adjusted under 35 U.S.C. 154(b) by 190 days.

(21) Appl. No.: 18/359,834

(22) Filed: Jul. 26, 2023

(65) Prior Publication Data
US 2024/0143831 A1 May 2, 2024

Related U.S. Application Data

(60) Provisional application No. 63/421,120, filed on Oct. 31, 2022.

(51) Int. Cl.
*G06F 21/62* (2013.01)
*G06F 16/28* (2019.01)

(52) U.S. Cl.
CPC ........ *G06F 21/6245* (2013.01); *G06F 16/285* (2019.01)

(58) Field of Classification Search
None
See application file for complete search history.

(56) References Cited

U.S. PATENT DOCUMENTS

| 2010/0205498 | A1 | 8/2010 | Chuang |
| 2010/0211851 | A1 | 8/2010 | Dixon |
| 2016/0205174 | A1 | 7/2016 | Pitio et al. |
| 2017/0155676 | A1 | 6/2017 | Tamir et al. |
| 2020/0167498 | A1* | 5/2020 | Pridgen ............... G06F 21/6245 |

OTHER PUBLICATIONS

UKIPO, "UK Application No. 2316699.4 Search and Examination Report mailed Apr. 11, 2024", 8 pages.

* cited by examiner

*Primary Examiner* — Cai Y Chen
(74) *Attorney, Agent, or Firm* — Strategic Patents, P.C.

(57) ABSTRACT

A data set can be analyzed for the presence of sensitive data using type-specific validation mechanisms to test data within the data set that superficially matches a corresponding data type format. In general, a type-specific validation mechanism may be applied to data segments within the data set when they match the data type format, and used to cumulatively build a statistical inference about whether the data set contains the corresponding data type. This technique may usefully be applied in a range of security contexts, such as characterizing data at rest or detecting leakage of sensitive data during a data transmission.

20 Claims, 11 Drawing Sheets

SENSITIVE DATA DETECTION

RELATED APPLICATIONS

This application claims priority to U.S. Prov. App. No. 63/421,120, filed on Oct. 31, 2022, the entire content of which is hereby incorporated by reference.

BACKGROUND

A variety of sensitive data types provide a built-in validation mechanism, such as one or more validation digits of a credit card number that are calculated based on remaining digits in the number. This permits dynamic validation on the fly, e.g., in a user interface or the like, where a user-provided number can be validated by applying the validation mechanism to the number as entered by the user. However, there remains a need for tools to accurately identify these types of sensitive data in larger data sets.

SUMMARY

A data set can be analyzed for the presence of sensitive data using type-specific validation mechanisms to test data within the data set that superficially matches a corresponding data type format. In general, type-specific validation mechanisms may be applied to data segments within the data set when they match the data type format, and used to cumulatively build a statistical inference about whether the data set contains the corresponding data type. This technique may usefully be applied in a range of security contexts, such as characterizing data at rest or detecting leakage of sensitive data during a data transmission.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
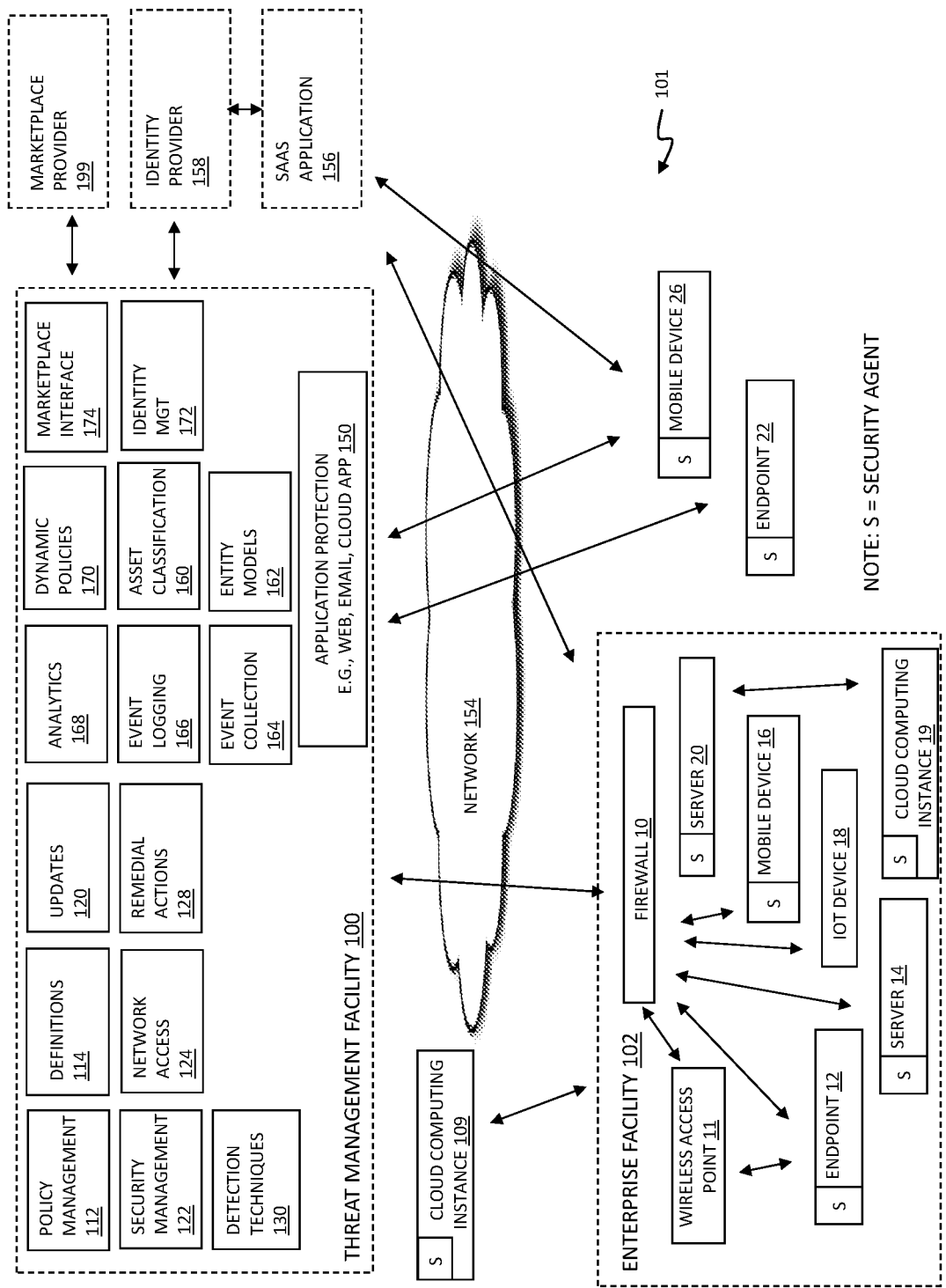
FIG. 1 depicts a block diagram of a threat management system in accordance with an example embodiment.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of application protection 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
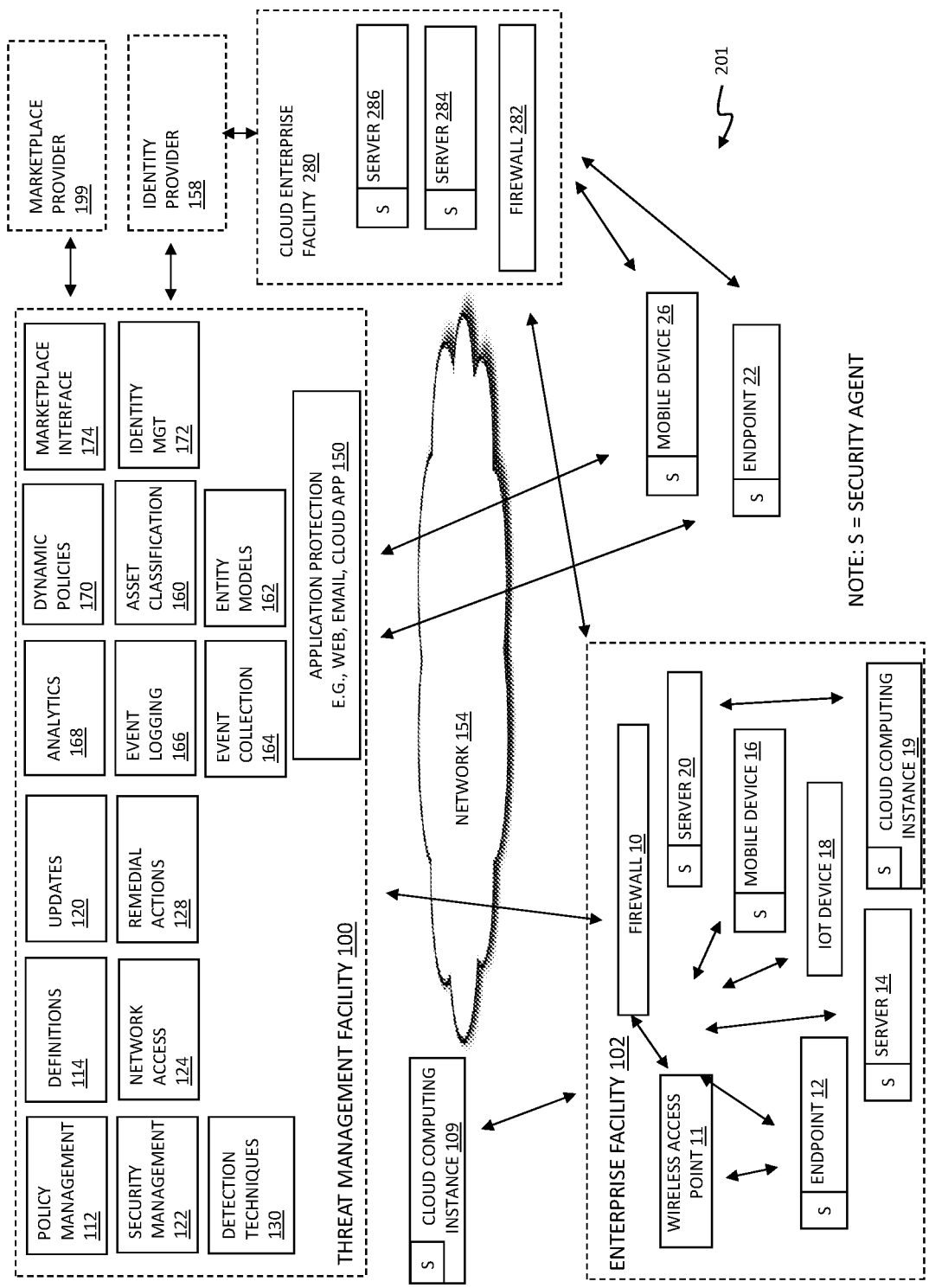
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
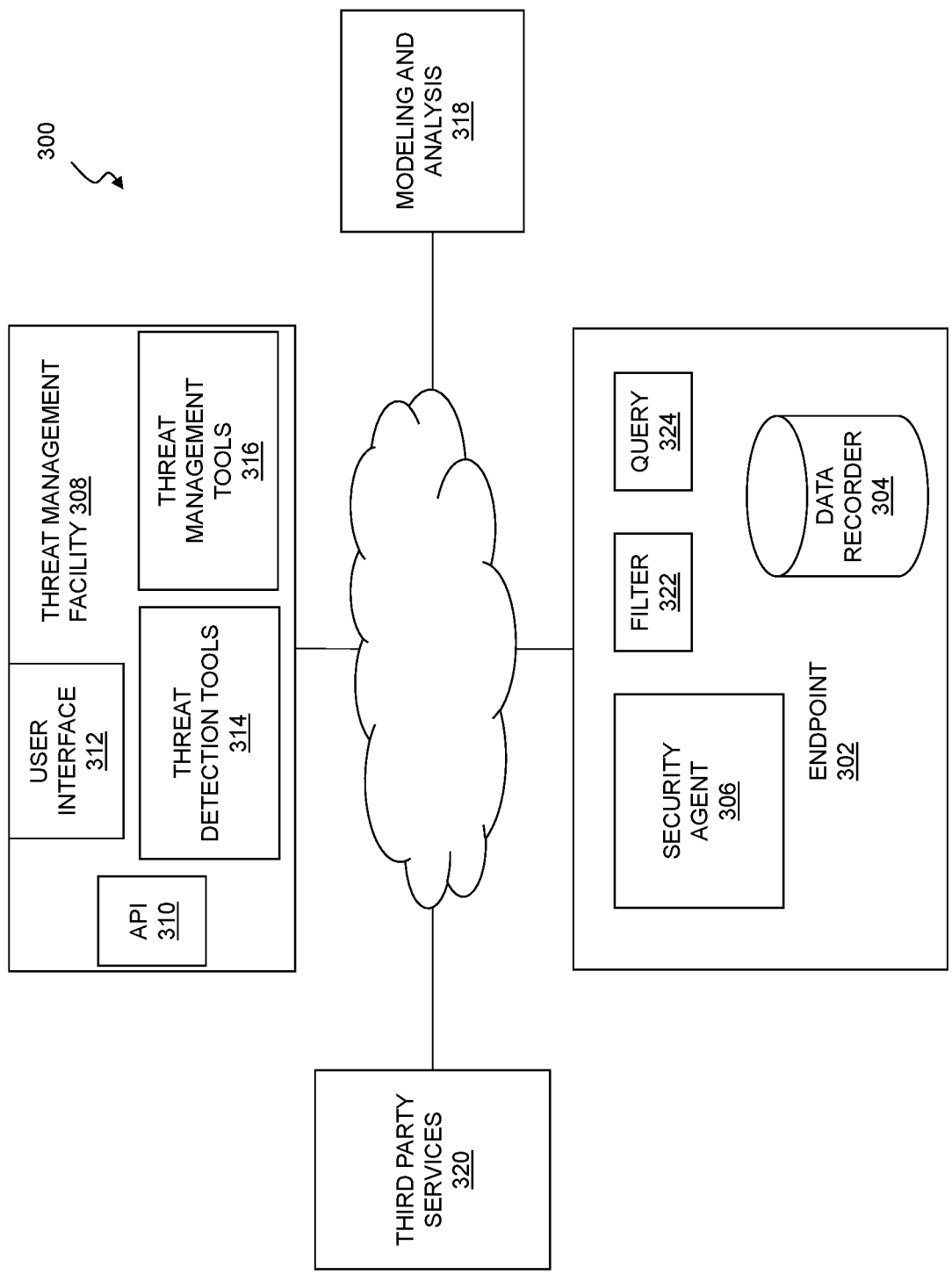
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
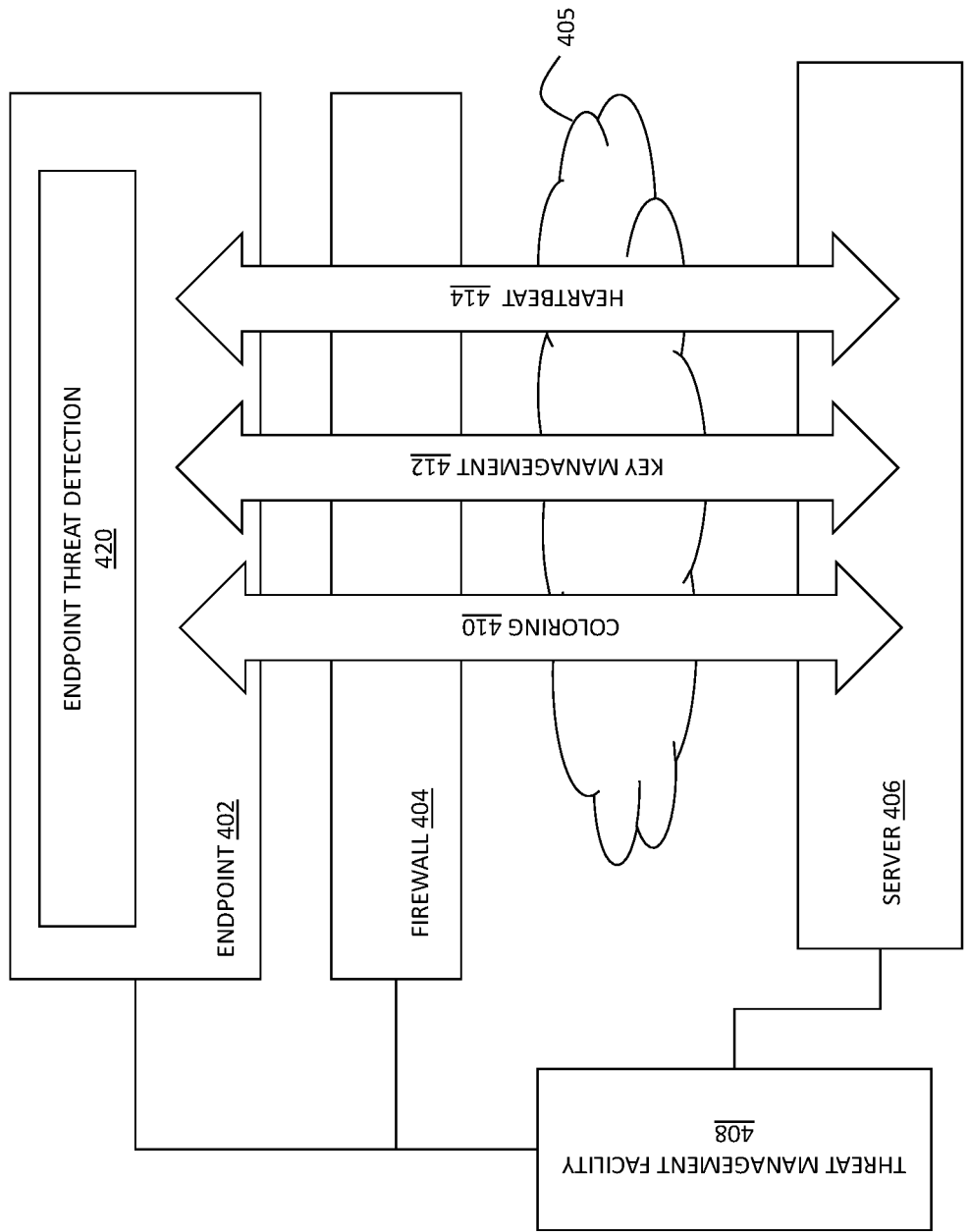
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing devices described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
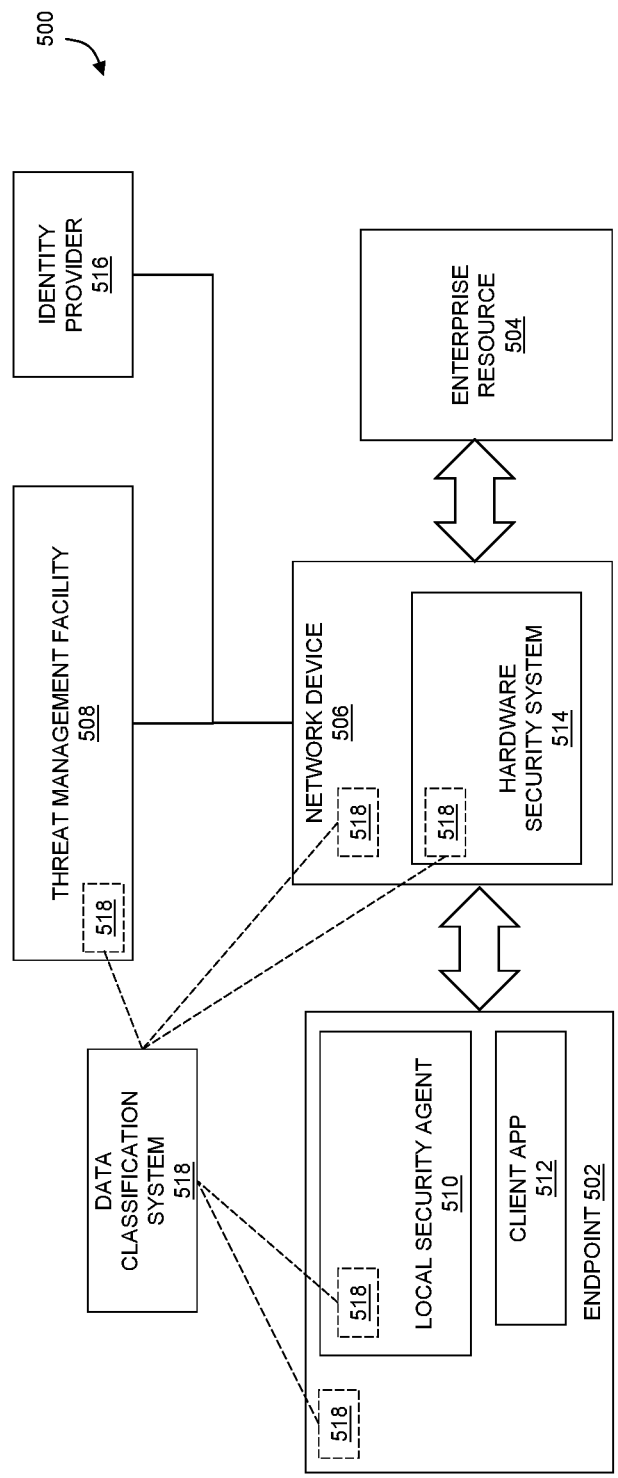
FIG. 5 shows an enterprise network.

FIG. 5 shows an enterprise network 500. In the enterprise network 500, which may include any of the enterprise networks described herein, an endpoint 502 may access an enterprise resource 504 through a network device 506, with security for the enterprise network 500 managed by a threat management facility 508.

The endpoint 502 may include any of the endpoints, endpoint devices, compute instances, or other physical or virtual computing devices described herein. In one aspect, a user of the endpoint 502 may request or seek to use the protected resource 504. As described herein, the endpoint 502 may execute a local security agent 510 that locally manages security of the endpoint 502 in cooperation with the threat management facility 508. The endpoint 502 may also execute a local application such as a web browser or other application that accesses (or requests access to) the enterprise resource 504 through the network device 506.

The enterprise resource 504 may generally include any application, database, data store, file server, web server, mail server, or other resource, such as any of the computing resources described herein or any other resource supported by an enterprise, including an application or the like locally hosted on customer premises, one or more remote resources, or any combination of these. In one aspect, the enterprise resource may include a protected resource such as an application secured by password access, or a zero-trust network access resource accessible through a zero-trust network access gateway for the enterprise network.

The network device 506 may include any of the network devices described herein, such as a firewall, switch, wireless access point, gateway, and so forth. In general, services operating on the network device 504 may support enterprise threat management through a connection to the threat management facility 508 and the local security agent 510 executing on the endpoint 502, while also facilitating access to enterprise resources 504. The network device 506 may advantageously incorporate a hardware security system 514 such as a dedicated chip or circuit that stores data for authenticating the network device 506. For example, Trusted Platform Module (TPM) is an international standard for a dedicated hardware cryptoprocessor that specifies an architecture, security algorithms, cryptographic primitives, root keys, and authorization standards that can be used for authentication. The TPM cryptoprocessor securely stores device-specific key material that is bound to a device at manufacture. The cryptoprocessor also supports various cryptographic functions (e.g., encryption, decryption, hashing, key generation, random number generation, etc.) for remote attestation to reliably authenticate the device on demand. In the context of a secure enterprise network, the hardware security system 514 permits the network device 506 to authenticate to the threat management facility 508 automatically or semi-automatically when the network device 506 is physically connected to a customer's enterprise network. While the Trusted Platform Module standard provides a useful and highly secure, hardware-based security system, any other standardized, proprietary, and/or commercial hardware-based security system may also or instead be used as the hardware security system 514 herein, provided the system provides suitable security, and supports remote authentication of the network device 506, e.g., from the threat management facility 508. For example, Platform Trust Technology from Intel™ and Platform Security Processor, such as firmware Trusted Platform Module (fTPM) from AMD™ provide similar functions and security to the TPM standard.

In one aspect, the network device 506 may include a zero-trust network access gateway that provides secure connectivity for client devices, such as the endpoint 502, to a protected resource such as the enterprise resource 504. The zero-trust network access gateway, may, for example, support client access via a WebSocket service and a client access port, such as a reverse proxy. The zero-trust network access gateway may facilitate establishing and maintaining a connection with an endpoint-deployed local security agent 510 that is adapted for operation in a ZTNA environment. In general, the zero-trust network access gateway may require authentication of endpoints 502 on a resource-by-resource basis. To this end, the system 100 may include an identity provider 516 that supports, e.g., secure, credential-based authentication of entities within the zero-trust network system 500.

The threat management facility 508 may include any of the threat management facilities or other security resources described herein. The threat management facility 508 may generally support security of the enterprise network 500, including a range of administrative services such as configuring gateways, managing protected resources, configuring the identity provider 516, monitoring ZTNA appliances, creating notifications, generating reports, managing users, and the like. In one aspect, the threat management facility 508 may support security by detecting new network hardware such as the network device 506 when it is added to the enterprise network, and by authenticating the new network hardware, such as the network device 506, before permitting network traffic through the network device 506.

It will be understood that the network device 506 may itself be an endpoint 502 that is managed by the threat management facility 508. It should also be noted that an endpoint 502 such as a client or other end user device may also include a hardware security system 514 that can be used to authenticate the end user device to the threat management facility 508. Thus, while the following description generally emphasizes the authentication of an endpoint 502 generally, it will be understood that the endpoint 502 may be network hardware that has been added to the enterprise network 500, and the techniques described herein may advantageously be used to securely and reliably authenticate such new hardware when it is added, and before network traffic is permitted through the newly added network hardware.

The enterprise network 500 may include, or be connected to, a data classification system 518 configured, e.g., as described below with reference to FIG. 6 and FIG. 7 below, to detect and manage sensitive data. The data classification system 518 may be embodied hardware, software, or some combination of these, and may be deployed on the threat management facility 508, the endpoint 502, a local security agent 510, the network device 506, a hardware security system 514, or some combination of these, as well as other locations such as local or remote resources used by an enterprise such as an electronic mail or messaging server, a cloud data storage facility, and so forth.

Figure 6:
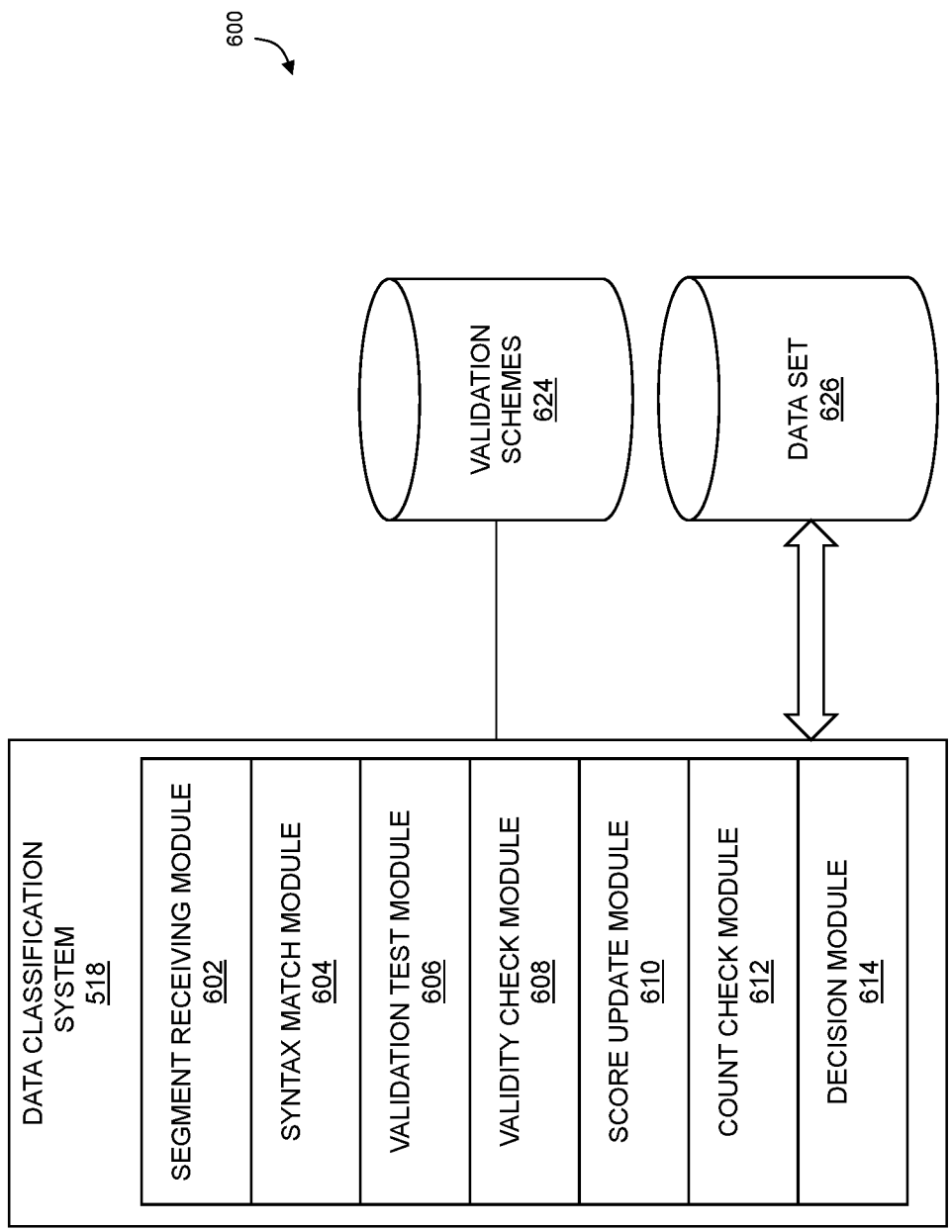
FIG. 6 shows a system for sensitive data detection.

FIG. 6 shows a system 600 for sensitive data detection. In general, the system 600 may include a classification system 518 for detecting sensitive data, a database 624 of validation schemes stored in a location accessible to the classification system 518, and a data set 626 containing data that is to be tested for sensitive contents. The classification system 518 may employ the techniques described herein to analyze the data set 626 for the presence of sensitive data. For example, this may include scanning the data set 626 for a data segment with a format or syntax matching a sensitive data type that uses a built-in or type-specific validation scheme for algorithmic self-validation, retrieving information about the corresponding validation scheme(s) from the database 624, and validating the data segment using the validation scheme, or more specifically, using a self-validation algorithm associated with the validation scheme. Results for a number of such data segments may be accumulated to obtain a statistical assessment of whether the data set 626 contains sensitive data.

As used herein, the term "validation scheme" may refer to any or all of the information describing a particular technique for validating data. Thus, for example, a validation scheme may refer to a data syntax and/or data structure for valid data, or the validation scheme may refer to a particular algorithm used to generate valid data and/or validate a data segment conforming to the data type's data structure. Or a validation scheme may refer to any or all of these features, as stored in the database 624 or elsewhere in a human-readable form, a computer-readable form, and/or a computer executable form. Thus, while the following description refers to, e.g., aspects of the validation scheme such as validation algorithms, a syntax for valid data, and so forth, any or all of these may be a validation scheme, or portion of a validation scheme, as that term is used herein.

The classification system 518 may, in general, be deployed as executable code or the like at any suitable location in an enterprise network or other security infrastructure. For example, the classification system 518 may be deployed in any of the network components described herein, such as a threat management facility 508, an endpoint 502, a local security agent 510, a network device 506, such as a gateway, a firewall, a hardware security system 514, or the like. The classification system 518 may also or instead be distributed among these components as necessary or helpful for a desired scope of protection. For example, where the classification system 518 is used to characterize data sets on an endpoint, the classification system 518 may be deployed within a local security agent of an endpoint, such as any of the local security agents described herein. In another aspect, where the classification system 518 is to be used for detecting data leakage, the classification system 518 may be deployed on an endpoint (e.g., where the classification system 518 scans data during transfer to a removable storage device), on a gateway or firewall (e.g., where the classification system 518 monitors network traffic for data leakage), on an electronic mail server (e.g., where the classification system 518 inspects electronic mail for potential data leakage), or on a threat management facility (e.g., where the threat management facility processes a data set for any of the foregoing).

Figure 7:
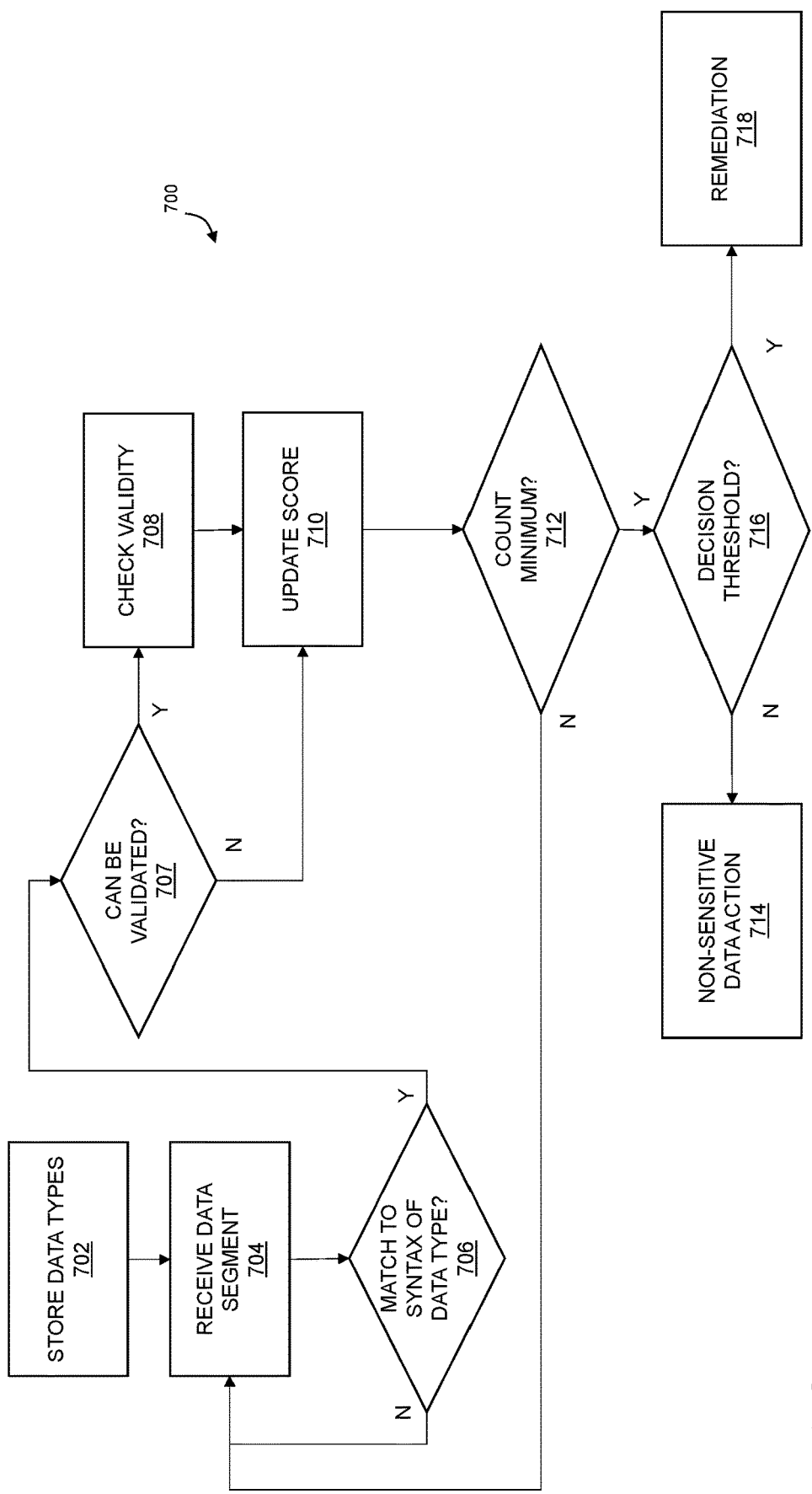
FIG. 7 shows a method for sensitive data detection.

The classification system 518 may include (e.g., via incorporating and/or by accessing) a variety of modules for performing data classification and sensitive data detection activities, such as those described in association with FIG. 7. For example, the classification system 518 may include a segment receiving module 602 for receiving segments of data for which classification and/or detection is desired. The classification system 518 may also include a syntax match module 604 that determines if a received segment corresponds to a syntax of a predetermined data type. The classification system 518 may also include a segment validation test module 606 that facilitates checking if a validation scheme is available for the received segment. The classification system 518 may also include a validity check module 608 that uses the validation schemes from validation scheme storage facility 624, such as to validate a segment. The classification system 518 may also include a score update module 610 for updating a score of a source of segments, such as one or more portions of data set 626. The classification system 518 may also include a count check module 612 for determining if certain minimum thresholds associated with validity checking are met. The classification system 518 may also include a decision module 614 that provides a classification (e.g., sensitive or non-sensitive) or otherwise selects an action for data based on, e.g., whether an updated score exceeds a decision threshold.

The classification system 518 may include, or may communicate with, any suitable remediation infrastructure, such as tools and systems for performing any of the remediation techniques described herein (e.g., the threat management facility 100 described with reference to FIG. 1), in order to respond to data leakage detections or similar security risks.

The database 624 of validation schemes may store information describing validation schemes, such names and descriptions of sensitive data formats (e.g., sensitive data syntax, data type, and the like), associated validation algorithms, and the like. For example, validation schemes may be used for a range of sensitive data types including credit card numbers, government identification numbers, Subscriber Identity Module (SIM) card numbers, and survey codes appearing on printed receipts, and the like. These data types may incorporate a validation digit based on a validation algorithm such as the Luhn algorithm, described in U.S. Pat. No. 2,950,048 and standardized in ISO/IEC 7812-1, which usefully provides a self-validation technique that is difficult to falsify based on visual inspection of a series of digits, and provides a high probability (e.g., 90%) that a particular series of digits is valid. Other validation algorithms may also or instead be used for various data types, and corresponding descriptions may be stored in the database 624 for use with data segments matching the appropriate syntax. For example, when a data segment from the data set 626 is determined to match the format for a credit card (e.g., sixteen consecutive digits), a Luhn algorithm for a validation scheme corresponding to a credit card data type in the database 624 may be used to attempt to validate the data segment as a credit card number.

The Luhn algorithm is a useful and well-known technique for validating data segments that include a self-validating, Luhn-based check digit or check value. While the Luhn algorithm offers a relatively low 10% chance of incorrectly validating a random numeric digit sequence, other techniques may also or instead be used. For example, another suitable technique includes an extension of the Luhn algorithm known as the Luhn mod N algorithm that generates a check character within a range of valid characters for an input data string (subject to the caveat that the input data string must have a length divisible by two). Other exemplary self-validation algorithms include the Verhoeff algorithm and the Damm algorithm. More generally, validation schemes for any self-validating data type, e.g., a mechanism for algorithmically self-validating a data segment that matches a format for a recognizable data type, may be stored in the database 624 and used to validate segments of a data set as described herein.

In another aspect, validation schemes stored in the database 624 may include algorithms for validating other data types that might not be algorithmically encoded but are nonetheless identifiably invalid over certain ranges of values. For example, a validation scheme may be useful in attempting to validate other types of data such as medical sensitive data (e.g., medical suppliers, licenses, patient identifiers and records, and the like), financial sensitive data (e.g., bank account and routing numbers, transaction identifiers, securities identifiers, and the like), personal identifiers (e.g., nation-specific numbers, tax and social security numbers, travel documents, biometric data, and the like), registered entity identifiers (e.g., business and employer (tax) identifiers), a birth date, an age, an address (e.g., via a zip code), a phone number, or the like, and this type of data may be sensitive in certain contexts, e.g., when paired with other personally identifiable information. As a more specific validation scheme example, a date may be expressed as a numerical arrangement that is limited by, e.g., months designated with numbers between 01 and 12, days designated with numbers between 01 and 31, and years spanning any period of interest. Thus, in one aspect, the algorithms for validating data types and sensitive data detection techniques described herein may be used to check for dates in the data set 626, and to check for other sensitive context or data based on any detected, valid dates.

The data set 626 may be any data set that can be examined for sensitive contents. This may, for example, include data at rest (e.g., stored at a location or locations accessible to the sensitive data classification system 518), data in transit (e.g., passing through a network location instrumented by or otherwise accessible to the sensitive data classification system 518), or some combination of these. This may include data stored on an endpoint, data being transferred to a portable memory device, data stored at an electronic mail server, data being transmitted through a firewall or gateway, data sent as an instant text message or electronic mail, data stored in a cloud storage resource, and so forth. The data set 626 may include data that is embodied as a file (e.g., an outgoing file), an image, a database, an email, a data stream, a cache of data, and the like. Further, the data set 626 may represent one or more sources of data including, without limitation data input from a user, stored data, data output from a process, data feeds, data streams, data objects, documents or other information objects whether text, binary, multimedia, or other data. As used herein, a data stream is generally intended to refer to data in transit and a data set is generally intended to refer to data at rest. However, the principles disclosed herein are generally applicable to both types of data, and the description is generally intended to include either or both of these types of data unless a different meaning is expressly provided or otherwise clear from the context.

FIG. 7 shows a flow chart of a method for sensitive data classification and/or detection. In general, a classification (e.g., sensitive data) score for a data set (or data stream) may be incrementally updated as data segments are identified (e.g., matched to a predetermined group of data types having known validation schemes, including built-in validation mechanisms) and tested (e.g., based on one or more validation schemes such as those described herein). As each valid/invalid result is obtained for another data segment, the classification data score can be incrementally updated until a reliable statistical inference can be drawn concerning whether the data set includes sensitive data. The method 700 may be performed, for example, by the sensitive data detection system 518, e.g., in response to detecting an event such as initiating transfer of data to a removable storage device, initiating communication of an electronic mail message with a large attachment, or any other event associated with possible data leakage or the like. The method 700 may also or instead be automatically performed on a scheduled basis. In one aspect, the method 700 may be administratively initiated on an ad hoc or regular basis to classify content or check for the presence of sensitive data at any suitable location including a compute instance of a user, a cloud storage facility for an enterprise, or any other location(s) that are managed by a threat management facility or other security infrastructure.

The method 700 may be used with any suitable data set or data stream including data inputs, stored data, data outputs, data feeds, data streams, message streams, data objects, documents, or other information objects, and may be applied to identify actionable patterns such as a potential leakage of sensitive data, sensitive data that is accidentally (or intentionally) stored in an insecure location, and so forth. The method 700 may also or instead be used to classify types of information in a data stream, e.g., as sensitive data including credit card numbers, personally identifiable information, confidential information, protected information, and the like, where an early and accurate classification might be used to trigger data leakage mitigation or other remedial measures.

As shown in step 702, the method 700 may include storing data types, including any of the sensitive data types or the like described herein, such as data types that include a self-validation mechanism, or data types that can be validated or identified with reference to other rules or information. In example embodiments, the data types may be stored along with other validation schemes and related information in the database 624 For example, this may include storing information for each such data type, such as a syntax or format associated with the data type (which may be used to determine whether a data segment might belong to the data type), and a validation algorithm for the data type. In general, the data type may be any type of data which may have a corresponding self-validation mechanism. Examples may include, without limitation, a credit card number, a personal identifier, a bank account or wire transfer information, a phone number, a date (e.g., birthdate), a SIM card number, a survey code appearing on a printed receipt, a Universal Product Code (UPC), an International Standard Book Number (ISBN), an International Securities Identifying Number (ISIN), a National Provider Identifier (NPI) for U.S. healthcare providers, an ABA routing transit number, a Vehicle Identification Number (VIN), a Customs and Border Protection entry number, and so forth. The syntax for a predetermined data type may be a corresponding data format, such as a number of digits, a number of letters, a number of alphanumeric symbols, an intervening pattern of characters (such as hyphens, commas, slashes, etc.), and so forth. This syntax may be used to determine, at the threshold, whether a data segment is a candidate for a type of data, such that a validation check might usefully be performed on the data segment using a corresponding validation scheme. In one aspect, a predetermined data type may correspond to a validation scheme that defines the location and use of portions of data within a data segment that are used for validation. For example, the predetermined data type (or more generally, the validation scheme for the predetermined data type) may define a first portion that contains uniquely identifying data, e.g., for an individual, an account, and so forth. The predetermined data type may also define a second portion that includes a check value or the like calculated by applying a predetermined algorithm to the first portion. A self-validating scheme for such a data type may include a validation algorithm that facilitates determining whether a data segment that matches the syntax for a data type is a valid data segment for that data type, e.g., because the second portion can be derived, based on the algorithm, from the first portion.

As shown in step 704, the method 700 may include receiving a data segment, such as with segment receiving module 602 of the data classification system 518. This may, for example, include receiving a data stream in transit between two network locations, e.g., when monitoring for data leakage in network communications, or this may include receiving a data stream or accessing a data set from a data storage location such as a cloud storage resource where data is being analyzed for content type, and the like.

In general, a data stream may be received all at once, in packets, in data blobs or other structured or unstructured aggregates, or in individual data segments, such as data segments matching one of the stored syntaxes. It will be appreciated that, while a representative embodiment of the method 700 includes incremental processing of a next sequential data segment from a data stream, the method 700 may also or instead include receiving a larger data unit (e.g., a file and the like), from which data segments may be processed serially or in parallel, and individually or in batches, based on the processing resources available for executing the method 700. Therefore, any of the steps in method 700 may be embodied as a plurality of threads, processes, or the like so as to facilitate processing a plurality of segments in parallel, for example. Additionally, it should be understood that data received during step 704 may not include any suitable segments and/or may not include any segments that match one of the stored syntaxes. Further, receiving a data segment in step 704 may include searching for data segments in a set of data (e.g., a file, archive, data stream, data base and the like) using any suitable search resources or tools. When there are no more segments to receive, the method 700 may proceed to one or more of a count limit step 712 and/or a scoring threshold step 716, both of which are described below.

As shown in step 706, the method 700 may include identifying a data segment in the data stream having the syntax of a predetermined data type, such as one of the data types stored in step 702. In general, this may include use of the syntax match module 604 of the data classification system 518 when comparing the data segment to a predefined syntax for the predetermined data type. Further, the predefined syntax may be an aspect of the validation scheme for the predetermined data type. For example, when checking for the predetermined data type of a credit card number, this may include searching for sixteen digits, and may or may not include spaces or the like therebetween (or optionally, may include a first version of the syntax with spaces and a second version of the syntax without spaces). Step 706 may also include processing a received data segment against multiple predetermined data types, e.g., based on a syntax for each of a plurality of the data types stored in step 702. In this case, the method 700 may include determining which, if any, predetermined data type corresponds to the received data segment. If the data segment does not match a syntax for any of the stored data types, the method may return to step 704 to receive a next data segment for processing. If a data segment processed at step 706 is identified as having the syntax of one of the stored data types, the method 700 may proceed to step 707 where the data type to which the data segment is matched is attempted to be associated with a validation scheme.

As shown in step 707, the method 700 may include checking if a validation scheme is available (e.g., in validation scheme data store 624 and the like) for the data type matched in step 706. Checking may be performed by a validation test module 606 of the data classification system 518. If the data type matched in 706 does not require and/or contain a validation scheme (e.g. a validation scheme is not available for the data type), the method may proceed to step 710 to update the sensitive data score and matched segment counters. For segments that are matched in step 706 to a data type that requires and/or contains a validation scheme, the method 700 may proceed to step 708.

As shown in step 708, the method 700 may include checking the validity of a data segment that matches a syntax for a predetermined data type, e.g., by using a validation algorithm from a corresponding validation scheme. Checking data segment validity may generally include retrieving a corresponding validation algorithm from the appropriate validation scheme (such as from the validation data scheme storage system 624), and applying the validation algorithm (such as with a validity check module 608 of the data classification system 518) to determine whether the data segment complies with validation requirements of the corresponding validation scheme. In some cases this involves determining that a portion of the data segment contains an appropriate check value or the like. In an example, a sixteen digit number segment may be determined to match the syntax of a credit card number in step 706. Checking data segment validity in this example may include applying a validation algorithm for a credit card number, e.g., using the Luhn algorithm to determine whether the sixteenth digit is a valid check value for the preceding fifteen digits of a card identifier. It should be appreciated that passing such a validity check does not ensure that the data segment belongs to the corresponding data type. While there is a high likelihood that this is the case (e.g., 90%, for Luhn validation), it is still possible some of the time (e.g., 10%, for Luhn validation) that a randomly generated number will appear to be a valid data segment for a particular data type. However, the converse is always true. That is, if a data segment fails a validation check, then it is certain that the data segment does not belong to the data type. This general statistical characteristic—low false positives—is advantageously exploited as further described herein to identify, with high accuracy, data sets that likely contain sensitive data. In another example of checking validity of a matched segment, a segment may match a format of a date. A corresponding validity algorithm may determine if values of portions of the segment that correspond to fields of a date are within acceptable ranges (e.g., months designated with numbers from 01 to 12 and days designated with numbers from 01 to 28/29/30/31 depending on the month number). If this segments fails a date validity algorithm, the segment may be determined to be invalid.

As shown in step 710, the method 700 may include updating a score for the data stream (or data set) based an outcome of one or more validity checks. A score update module 610 of the data classification 518 may be used for updating the score. This may include, e.g., incrementally updating a data classification/sensitivity/leakage risk score as each data segment is validated by step 708. This may include, e.g., incrementally updating the score for each data segment that is determined at step 707 to not require and/or contain a validation scheme. The score may be updated in a number of ways. For example, the score may include a numeric value that is incremented for valid data segments and decremented for invalid data segments to provide a running total of individual validity test results obtained using a validation scheme. The score may be incremented or decremented for segments that are determined in step 702 as not associated with a validation scheme. The increment value may be equal to the decrement value, or these values may be weighted relative to one another in order to increase or decrease detection sensitivity or otherwise address known contextual biases. In another aspect, the score may be calculated as a relative proportion of valid to invalid data segments, a proportion of valid to total data segments processed for validity (valid+invalid), or a proportion of valid data segments to total data in a data set. More generally, any technique for quantitatively representing a relationship of valid and invalid data segments based on an internal self-validation mechanism such as any of the validation schemes described herein may be maintained and used to draw statistical supported inferences about whether the data stream contains data belonging to a corresponding data type.

In one aspect, updating a score may include updating multiple scores, such as a valid data segment score and an invalid data segment score, each of which may be used when calculating a current score or applying a scoring threshold to decide next steps. In another aspect, updating a score may also include updating a plurality of scores, each one of the plurality of scores associated with a different data type having a different syntax and/or different check value. This approach may be usefully applied when a data set includes heterogenous data types (e.g., some social security numbers, some phone numbers, some VINs, and the like).

As shown in step 712, the method 700 may include applying a segment count minimum as a first threshold for further processing. The segment count minimum may be a total number of data segments to be analyzed, after which a reliable inference (e.g., classification) can be drawn that the data set or data stream does (or does not) contain sensitive data. Applying the segment count minimum may include use of a count check module 612 by the data classification system 518 when comparing a stored value to the count of data segments that have been analyzed. Where a segment count minimum is reached in step 712, method 700 may proceed to step 716 to decide if and what remedial action may be taken. If the segment count minimum has not yet been reached, the method may proceed back to step 704. As further described herein, the segment count minimum may be relatively small, e.g., five to ten data segments, and still support a reliable inference concerning the presence of sensitive data. It will also be understood that the segment count minimum may be variable. For example, in some cases the segment count minimum may be raised or lowered when the updated score is within a certain range, or above or below a predetermined value. If the segment count minimum has not yet been met, the method 700 may return to step 704. If the segment count minimum is met, the method 700 may proceed to step 716 where any appropriate remedial action may be decided.

As shown in step 716, the method 700 may include applying a decision threshold to the updated score, such as to determine which of various possible actions to take. In example embodiments, applying the decision threshold may be achieved by the data classification system 518 utilizing the decision module 614 that may have access to one or more threshold data structures (not shown) for determining which of the various possible actions to take. In general, this threshold may be any value or combination of values representing a reliable inference, e.g., with a high statistical likelihood, that the data set or data stream includes sensitive data. This may include thresholds for the number of samples analyzed, for the number of valid results, for the number of invalid results, for the difference or ratio of valid and invalid results, or any combination of these. With respect to the reliability of the inference, it should be noted that, using a Luhn-based validator with a per-data-segment detection accuracy of 90% for objectively identifiable sensitive data, the probability of a false positive after three sequential validations reduces from 23% without this method to 0.1% with this method. Thus, as a significant advantage, the techniques described herein support a very computationally efficient technique for accurately detecting a collection of sensitive data by analyzing a small set of samples.

A scoring threshold for validations may include two or more values, such as a first value for determining that the data set likely includes sensitive data and a second value for determining that the data set likely does not include sensitive data, or a first threshold for the number of valid segments and a second threshold for the number of invalid segments. These thresholds may be used alone, or in combination with a cumulative comparison of score updates such as a difference or ratio between score increments and score decrements.

In one aspect, a scoring threshold may be applied for the total number of data segments analyzed, followed by a relative comparison of validation passes and fails. For example, after the minimum number of data segments (e.g., segment count minimum) have been processed through the validity check, if a majority (e.g., more than one-half of the sample size) of the segments processed are valid segments, a determination can be made that that the data set contains sensitive data. The reliability of this inference will depend on the size of the threshold and the number of passes and fails.

If a scoring threshold is met, the method 700 may proceed to step 718, whereat one or more of the systems described herein for taking remedial action, including without limitation the threat management facility 508, the local security agent 510, any of the network devices 506 (e.g., a firewall and/or gateway), the data classification system 518, or the like may take a suitable sensitive data remedial action, examples of which are described below and elsewhere herein. If all scoring thresholds are not met, the method 700 may proceed to step 714, whereat one or more of the systems described herein may take a suitable non-sensitive data action.

As a significant advantage, evaluating risk in this manner permits useful inferences about risk without requiring complete analysis of a data set, while mitigating false positives that might accidentally result from an early concentration of positive results in an incremental analysis.

As shown in step 714, an inference has been drawn that the data set or data stream does not contain sensitive data, or more generally, does not appear to present a sensitive data leakage or other security risk. Non-sensitive data actions may include terminating the method 700 without further action, recording the updated score, allowing a transfer of data, decreasing security, alerting an administrator for the data set, and the like. In general, the method 700 may return to step 704 if and when additional data becomes available for analysis.

As shown in step 718, the method 700 may include initiating a remedial action in response to the updated score (e.g., an updated data leakage score) being determined to reach the predetermined threshold in step 716. This may include any remedial action suitable to the nature of the detection, including, without limitation any of the remedial actions described herein. By way of non-limiting examples, this may include terminating the method without further action, recording the updated score, terminating a network connection for a device containing the data set or sourcing a data stream, allowing a transfer of data, requesting credentials or other indicia of authorization from a recipient of the data, increasing network security, decreasing network security, scanning the location of a device or data store for malware, or any other type of remedial action or other action(s)/step(s) described herein.

Although exemplary modules of the data classification system 518 are referenced for the actions of the method 700, these references are by way of example only. The actions of method 700 may instead and/or in addition be performed by any other combination of hardware and software, including any suitable arrangement of modules for performing the various steps described above. As also noted above, the steps and or modules may usefully be distributed among multiple components of an enterprise network.

Figure 8:
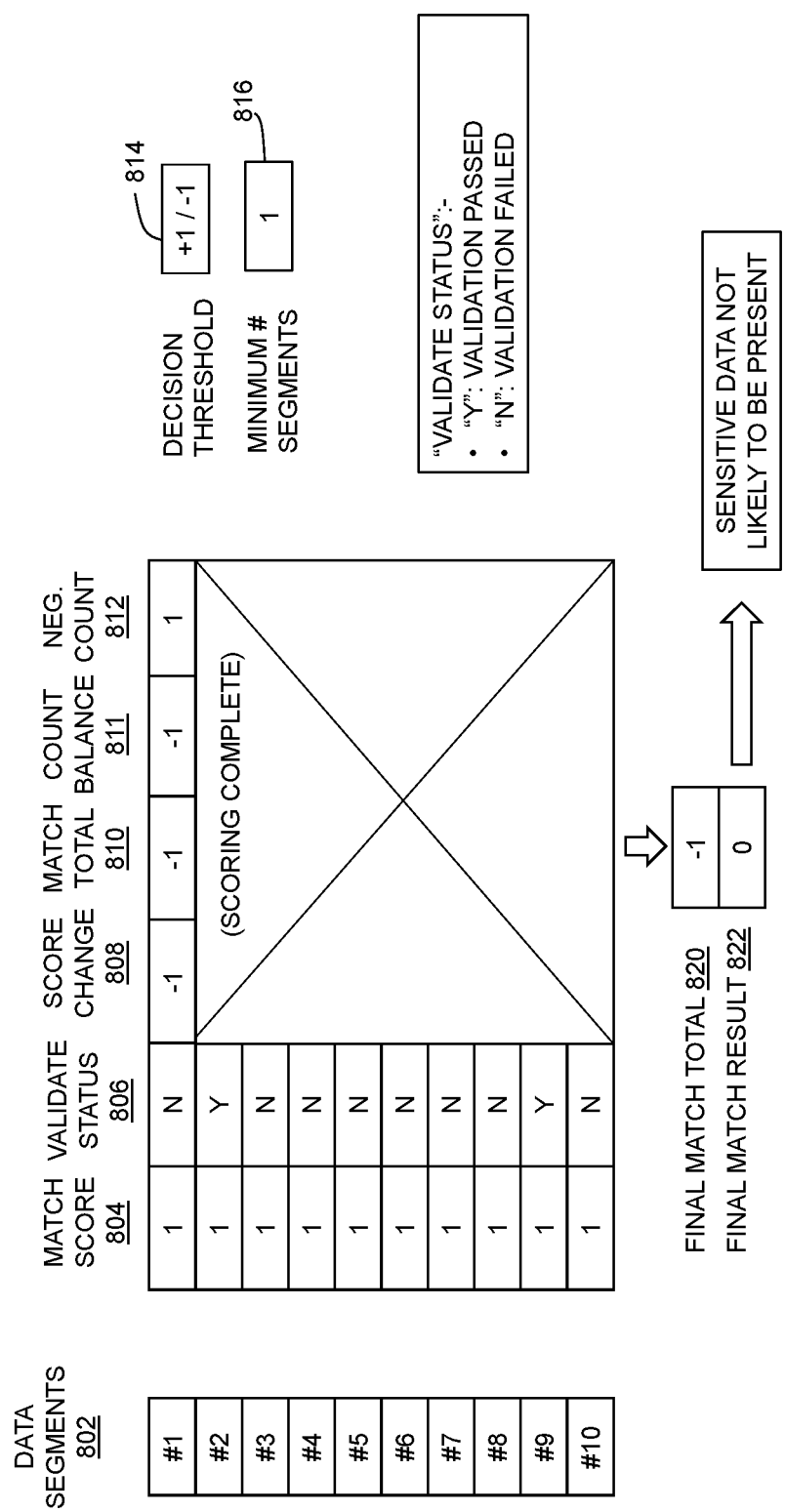
FIG. 8 illustrates a calculation for sensitive data detection.

FIG. 8 illustrates data values and calculations associated with an instance of use of the data classification system 518 for sensitive data detection. In general, the data values depicted in FIG. 8 are associated with one or more operations of the data classification system 518. In particular, the data values depicted in FIG. 8 are for a sequence of data segments 802 that match a syntax for a validation scheme. While ten data segments are illustrated, it will be understood that any number of data segments may be analyzed using the techniques described herein. It will also be appreciated that for a validation scheme with a single, additional validation digit, a statistically reliable conclusion can typically be reached in a small number of trials. As such, in many practical cases, significantly less than ten data segments might be needed to reach an actionable conclusion about a presence of sensitive data and/or possible data leakage.

Data values associated with an instance of use of the data classification system 518 may include a number of variables including, e.g., a match score 804 for each data segment (typically, but not necessarily, a value of 1). This match score 804 value is a value used in updating a cumulative sensitive data score (e.g., a data leakage risk score) based on a corresponding one of the data segments. A validate status 806 may be a binary flag (e.g., yes or no) or other indicator of a validation result for the corresponding data segment. A score change 808 reflects a score update value resulting from a validation status for a data segment. In a simple scoring system, a match score 804 of 1 is used for all data segments, so the score will increment +1 for each validation pass, and decrement −1 for each validation fail. A match total 810 may be maintained, e.g., as a sum of the score change 808 for each sequential data segment. A count balance 811 may also be maintained, which shows a running difference between the number of validation passes and validation fails. However, for the purposes of the following examples, where each match score 804 is identically 1 (e.g., the validation checks are all unweighted), the count balance 811 will equal the match total 810. A negative count 812 may also be maintained, which is equal to a running total count of validation fails. This may be useful, e.g., where one of the thresholds for detecting sensitive data is based on a count of segments that fail to validate. A decision threshold 814 may be used, e.g., to establish a minimum match total 810 (negative or positive match balance) before making a determination regarding the data set or stream containing sensitive data. A minimum segment count 816 may also be used, and may establish a minimum number of data segments to be tested before enabling a sensitive data threshold, such as the decision threshold 814. In example embodiments, a final match total 820 may be updated to match the current match total 810 once all criteria for making a sensitive data determination are met. Alternatively, the final match total 820 may be updated during processing of segments, but may only be relied upon once all criteria for making a sensitive data determination are met. These latter parameters facilitate tuning of how many segments must be processed, and how many potential items of sensitive data are found, before initiating remediation based on a conclusion of sensitive data leakage.

The example of FIG. 8 depicts results of applying the actions of the sensitive data system 518 (e.g., a variant of the method 700) to a random data set (e.g., a data set that does not contain sensitive data) that is presented to the system 518 in sequence starting from data segment #1. With a decision threshold 814 of 1 and a minimum segment count 816 of 1, a negative final match total 820 is achieved by processing the first data segment 802 #1, which includes a data segment that fails a validation test. Recall that the data set used in this example is a data set that does not contain sensitive data. This results in a final match result 822 of 0, which in this example indicates a conclusion that sensitive data is not likely to be present. As discussed above, even with these simple thresholds and random data, the use of the methods and systems for data classification and/or sensitive data detection described herein will avoid false positives ninety percent of the time for a Luhn-type validation scheme. A result corresponding to the final match result 822 may be returned to a user (e.g., via a user interface) or otherwise acted upon by a threat management facility or the like.

Figure 9:
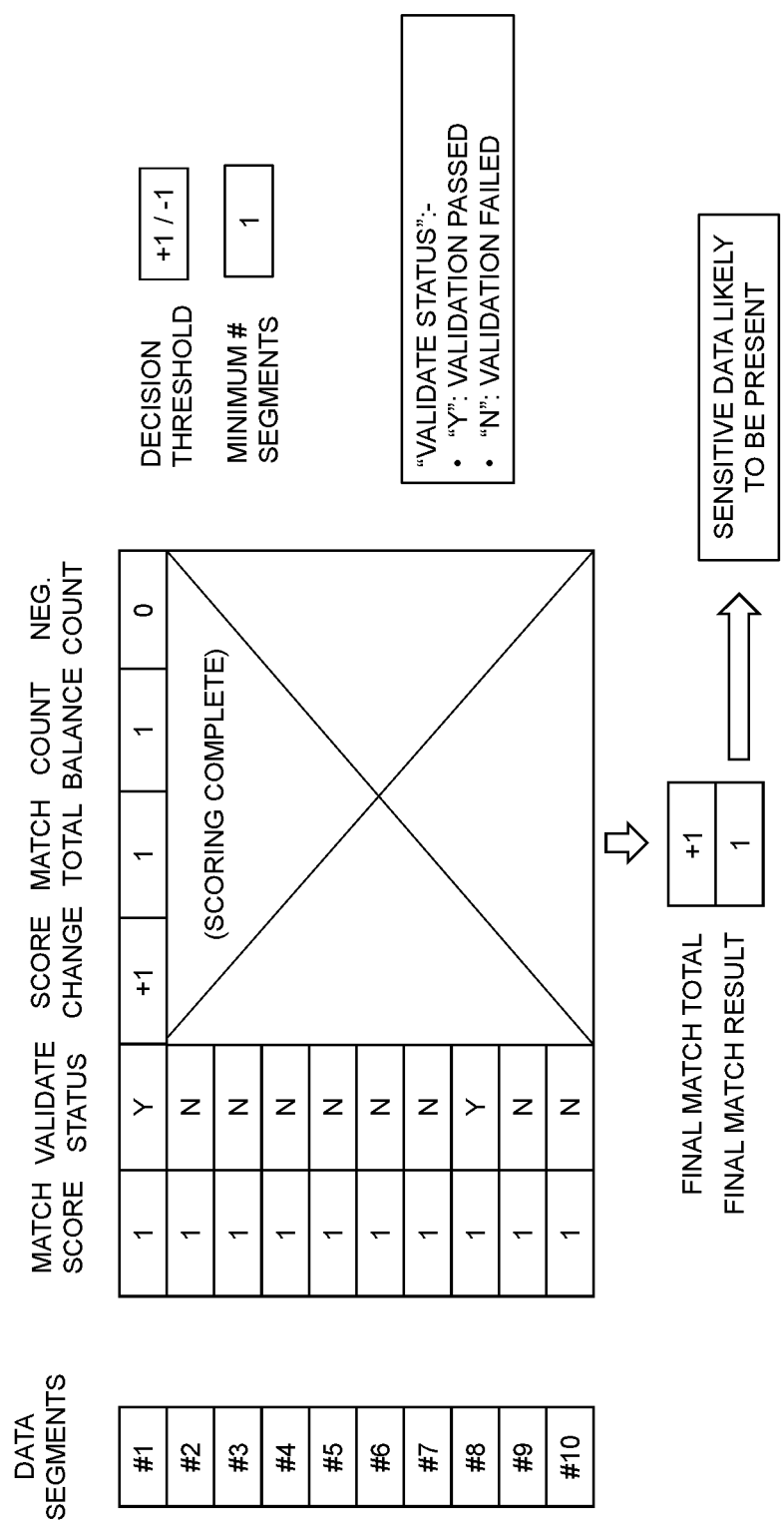
FIG. 9 illustrates a calculation for sensitive data detection.

FIG. 9 depicts data values and calculation results of an instance of the data sensitivity system 518 that produces a false positive detection of sensitive data. In the example of FIG. 9, a data segment, although random (does not contain sensitive data), passes the validation test (e.g., such as the validity check performed during step 708 of method 700). Because the decision threshold of 1 has been reached (in this case, with a positive total of 1), and because the minimum segment count of at least one comparison has been made, the criteria (e.g., decision threshold and minimum segment count) for accepting a conclusion have been satisfied and the final match total (of +1) yields a (false) positive final match result conclusion that sensitive data is present. A result corresponding to the final match result may be returned to a user or otherwise acted upon by a threat management facility or the like.

Figure 10:
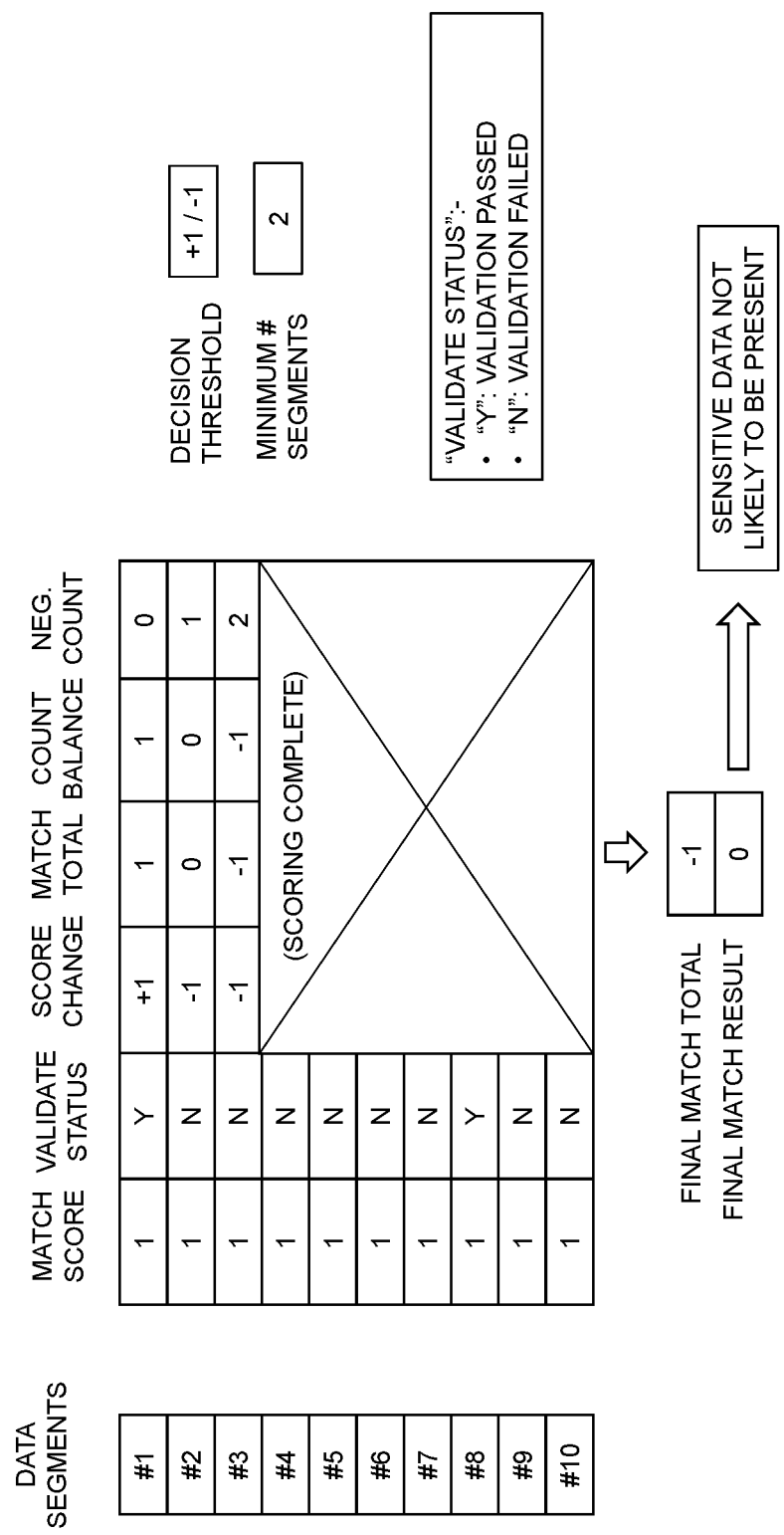
FIG. 10 illustrates a calculation for sensitive data detection.

FIG. 10 depicts data values and calculation results of an instance of the data sensitivity system 518 configured to mitigate the chances for reaching a false positive, such as by increasing the minimum number of segments required to be processed to, e.g., a value of 2. As a result of requiring at least two segments to be processed before a decision threshold value can be applied, an initial (false) positive result for the first data segment (#1) that changed the match total to 1 and otherwise may satisfy the decision threshold of +1/−1, is bypassed because processing one segment does not satisfy the minimum segment count value of 2. A second data segment (#2) may then be analyzed, and in this case the data segment yields a validation fail. The match total returns to 0, and the negative count increments to 1. At this point, the minimum segment count value (2) has been reached because two comparisons have been made. However the match total of 0 does not meet the decision threshold of +1/−1. A third comparison is made, and in this case the data segment (#3) also fails a validation test for sensitive data. The match total decrements by 1, resulting in a −1 match total, which satisfies the decision threshold. Furthermore, a total of three segments have been processed so the minimum segment count criterion (2) is also satisfied. As such, a conclusion may be reached based on the cumulative analysis across the three segments, and in this case a final match total of −1 yields a conclusion that sensitive data is not likely to be present for this data set or data stream. A result corresponding to the final match result may be returned to a user or otherwise acted upon by a threat management facility or the like.

As noted above, while simple cumulative scoring totals may usefully be employed to reach statistically reliable conclusions about the presence of sensitive data and/or potential data leakage, other techniques may also or instead be used, including ratios of positive and negative results, thresholds for additional parameters (e.g., a minimum number of positive results, a minimum number of negative results, etc.), weightings for different sequential validation tests, and so forth. All such variations are intended to fall within the scope of this disclosure.

Figure 11:
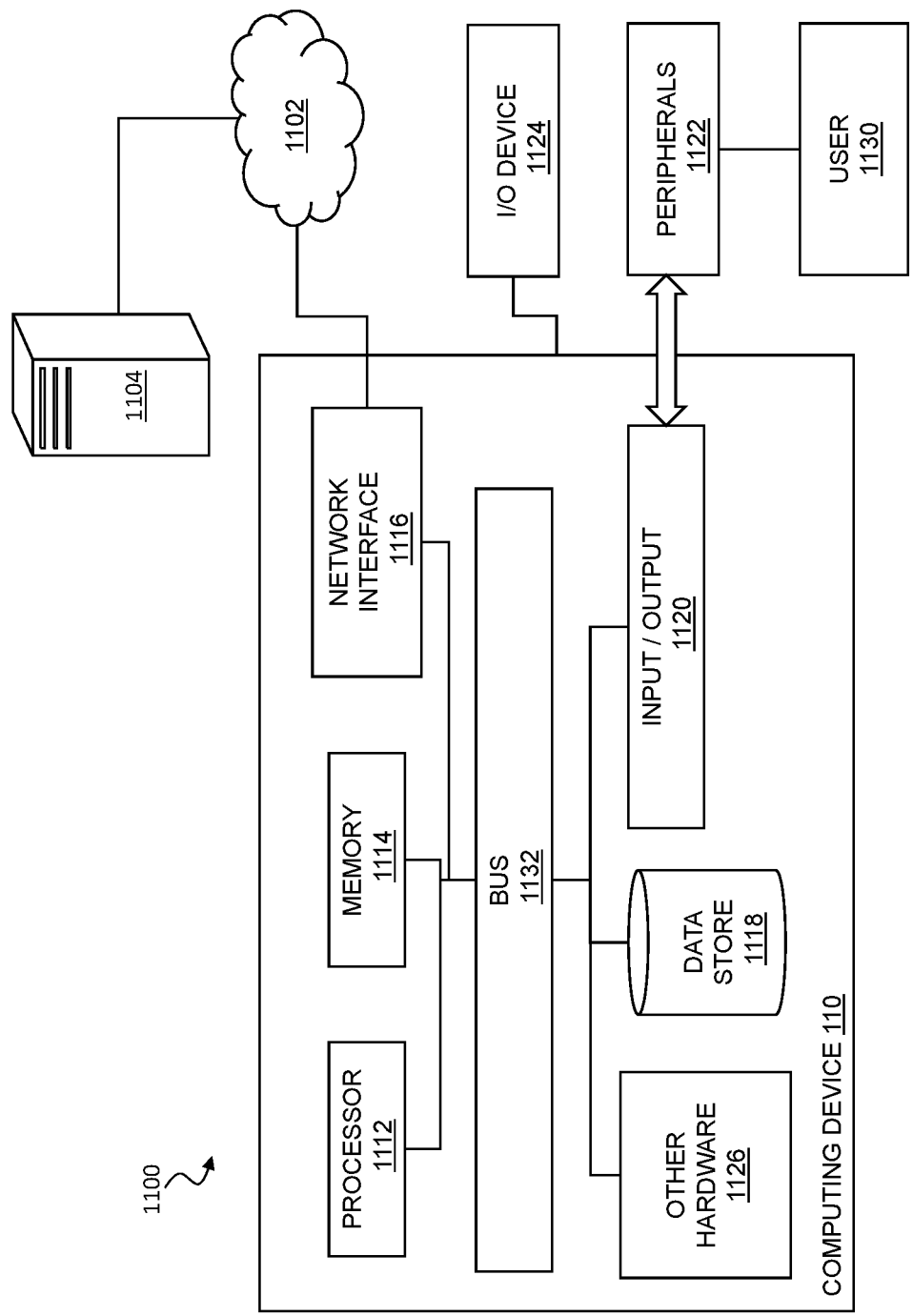
FIG. 11 is a diagram of a computing device.

FIG. 11 is a diagram of a computer system 1100 for use in the methods and systems of sensitive data detection and/or data classification described herein. In general, the computing system 1100 of FIG. 11 may be, or may host or otherwise support, any of the components described herein, such as and without limitation, an endpoint, network device, data classification system, enterprise resource, threat management facility, identity provider, hardware security system, and the like.

The computer system 1100 may include a computing device 1110 connected to a network 1102, e.g., for accessing an external device 1104. The computing device 1110 may be or include any type of network endpoint or endpoints as described herein. For example, the computing device 1110 may include a desktop computer workstation. The computing device 1110 may also or instead be any other device that has a processor and communicates over a network 1102, including without limitation a laptop computer, a desktop computer, a personal digital assistant, a tablet, a mobile phone, a television, a set top box, a wearable computer, and so forth. The computing device 1110 may also or instead include a server, or it may be disposed on a server or within a virtual or physical server farm. In certain aspects, the computing device 1110 may be implemented as a set of hardware components for executing software. The computing device 1110 may be a standalone device, a device integrated into another entity or device, or may be distributed across multiple entities.

The network 1102 may include any network or combination of networks, such as one or more data networks or internetworks suitable for communicating data and control information among participants in the computer system 1100. The network 1102 may include public networks such as the Internet, private networks, and telecommunications networks such as the Public Switched Telephone Network or cellular networks using third generation cellular technology (e.g., 3G or IMT-2000), fourth/fifth generation cellular technology (e.g., 4G, LTE, MT-Advanced, E-UTRA, 5G, etc.) or WiMax-Advanced (IEEE 802.16m)) and/or other technologies, as well as any of a variety of corporate area, metropolitan area, campus, or other local area networks or enterprise networks, along with any switches, routers, hubs, gateways, and the like that might be used to carry data among participants in the computer system 1100. The network 1102 may also include a combination of data networks, and need not be limited to a strictly public or private network. Embodiments of the network 1102 may include one or more enterprise networks as described herein.

The external device 1104 may be any computer or other remote resource that connects to the computing device 1110 through the network 1102. This may include threat management resources such as any of those contemplated above, gateways or other network devices, remote servers or the like containing content requested by the computing device 1110, a network storage device or resource, a device hosting content, or any other resource or device that might connect to the computing device 1110 through the network 1102.

The computing device 1110 may include a processor 1112, a memory 1114, a network interface 1116, a data store 1118, and one or more input/output devices 1120. The computing device 1110 may further include or be in communication with one or more peripherals 1122 and other external input/output devices 1124.

The processor 1112 may be any as described herein, and in general may be capable of processing instructions for execution within the computing device 1110 or computer system 1100. In one aspect, the processor 1112 may be capable of processing instructions stored in the memory 1114 or on the data store 1118.

The memory 1114 may store information within the computing device 1110 or computer system 1100. The memory 1114 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 1114 may store program instructions, program data, executables, and other software and data useful for controlling operation of the computing device 1110 and configuring the computing device 1110 to perform functions for a user. While a single memory 1114 is depicted, it will be understood that any number of memories may be usefully incorporated into the computing device 1110. For example, a first memory may provide non-volatile storage such as a disk drive for permanent or long-term storage of files and code even when the computing device 1110 is powered down, and a second memory such as a random-access memory may provide volatile (but higher speed) memory for storing instructions and data for executing processes.

The network interface 1116 may include any hardware and/or software for connecting the computing device 1110 in a communicating relationship with other resources through the network 1102. This may include connections to resources such as remote resources accessible through the Internet, as well as local resources available using short range communications protocols using, e.g., physical connections (e.g., Ethernet), radio frequency communications (e.g., WiFi or Bluetooth), optical communications, (e.g., fiber optics, infrared, or the like), ultrasonic communications, or any combination of these or other media that might be used to carry data between the computing device 1110 and other devices. The network interface 1116 may, for example, include a router, a modem, a network card, an infrared transceiver, a radio frequency (RF) transceiver, a near field communications interface, a radio-frequency identification (RFID) tag reader, or any other data reading or writing resource or the like. More generally, the network interface 1116 may include any combination of hardware and software suitable for coupling the components of the computing device 1110 to other platforms, computing or communications resources, and so forth.

The data store 1118 may be any internal memory store providing a computer-readable medium such as a disk drive, an optical drive, a magnetic drive, a flash drive, memory card, or other device capable of providing mass storage for the computing device 1110. The data store 1118 may store computer readable instructions, data structures, program modules, and other data for the computing device 1110 or computer system 1100 in a non-volatile form for subsequent retrieval and use. The data store 1118 may store computer executable code for an operating system, application programs, and other program modules, software objects, libraries, executables, and the like the like. The data store 1118 may also store program data, databases, files, media, and so forth.

The input/output interface 1120 may support input from and output to other devices that might couple to the computing device 1110. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices.

The peripherals 1122 may include any device or combination of devices used to provide information to or receive information from the computing device 1110. This may include human input/output (I/O) devices such as a keyboard, a mouse, a mouse pad, a track ball, a joystick, a microphone, a foot pedal, a camera, a touch screen, a scanner, or other device that might be employed by the user 1130 to provide input to the computing device 1110. This may also or instead include a display, a speaker, a printer, a projector, a headset, or any other audiovisual device for presenting information to a user or otherwise providing machine-usable or human-usable output from the computing device 1110. The peripheral 1122 may also or instead include a digital signal processing device, an actuator, or other device to support control of or communication with other devices or components.

Other hardware 1126 may be incorporated into the computing device 1110 such as a co-processor, a digital signal processing system, a math co-processor, a graphics engine, a video driver, and so forth. The other hardware 1126 may also or instead include expanded input/output ports, extra memory, additional drives (e.g., a DVD drive or other accessory), and so forth.

A bus 1132 or combination of busses may serve as an electromechanical platform for interconnecting components of the computing device 1110 such as the processor 1112, memory 1114, network interface 1116, other hardware 1126, data store 1118, and input/output interface 1120. As shown in the figure, each of the components of the computing device 1110 may be interconnected using a system bus 1132 or other communication mechanism for communicating information.

Methods and systems described herein can be realized using the processor 1112 of the computer system 1100 to execute one or more sequences of instructions contained in the memory 1114 to perform predetermined tasks. In embodiments, the computing device 1110 may be deployed as a number of parallel processing systems coordinated to execute code together for improved performance. Instances of the computing device 1110 may be realized in a virtualized environment where software on a hypervisor or other virtualization management facility emulates components of the computing device 1110 as appropriate to reproduce some or all of the functions of a hardware instantiation of the computing device 1110.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

More generally, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A computer program product comprising computer executable code embodied in a non-transitory computer readable medium that, when executing on one or more computing devices, causes the one or more computing devices to perform the steps of:
   receiving a plurality of data segments, wherein
      each data segment matches a syntax for a predetermined data type, and
      a validation scheme for the predetermined data type defines a first portion and a second portion of a valid data segment, wherein the second portion includes a check value calculated by applying a predetermined algorithm to the first portion;
   detecting a data leakage in the plurality of data segments by:
      incrementing a risk count for each one of the data segments that passes a validation using the predetermined algorithm and the check value,
      decrementing the risk count for each one of the data segments that fails the validation using the predetermined algorithm and the check value, and
      detecting the data leakage in response to the risk count meeting a first predetermined threshold;
      detecting no data leakage in the plurality of data segments in response to the risk count meeting a second predetermined threshold; and
   in response to detecting the data leakage, remediating a leakage of sensitive data associated with the risk count meeting the first predetermined threshold.

2. The computer program product of claim 1, wherein the first predetermined threshold is a quantitative threshold indicating that a majority of the data segments are of the predetermined data type.

3. The computer program product of claim 1, wherein the predetermined data type includes at least one of a social security number, a credit card number, a telephone number, a bank account number, and a driver's license number.

4. The computer program product of claim 1, further comprising code that, when executing on the one or more computing devices, causes the one or more computing devices to perform the step of, maintaining a plurality of risk counts for the plurality of data segments, each one of the plurality of risk counts associated with a different syntax of a different data type having a different check value calculated with a different predetermined algorithm.

5. A method comprising:
   receiving a plurality of data segments, wherein:
      each data segment matching a syntax for a predetermined data type, and
      a validation scheme for the predetermined data type defining a first portion and a second portion of a valid data segment, the second portion including a check value calculated by applying a predetermined algorithm to the first portion;
   identifying a first quantity of the plurality of data segments as valid for the predetermined data type based on a presence of corresponding check values calculated with the predetermined algorithm;
   identifying a second quantity of the plurality of data segments as invalid for the predetermined data type based on an absence of corresponding check values calculated with the predetermined algorithm;
   detecting a potential data leakage based on the first quantity and the second quantity; and
   in response to detecting the potential data leakage, remediating a leakage of sensitive data associated with the predetermined data type.

6. A method comprising:
   storing a validation scheme for a predetermined data type of sensitive data, the validation scheme including:
      a syntax associated with the predetermined data type, and
      a validation algorithm for the predetermined data type;
   receiving a data stream;
   identifying a data segment in the data stream having the syntax of the predetermined data type;
   performing an evaluation of whether the data segment belongs to the predetermined data type based on the validation algorithm; and
   incrementally updating a data classification score for the data stream based on the evaluation of the data segment in the data stream.

7. The method of claim 6, further comprising, in response to the data classification score meeting a predetermined threshold, initiating a remedial measure to address a leakage of data of the predetermined data type.

8. The method of claim 6, wherein the data stream includes a network data flow from an endpoint in an enterprise network.

9. The method of claim 6, wherein the data stream includes a stream of data retrieved from a data store.

10. The method of claim 6, wherein the evaluation includes calculating a check value for the data segment based on the validation algorithm and checking for a presence of the check value in the data segment.

11. The method of claim 6, wherein incrementally updating the data classification score includes increasing the data classification score when the evaluation indicates that the data segment belongs to the predetermined data type.

12. The method of claim 6, wherein incrementally updating the data classification score includes decreasing the data classification score when the evaluation indicates that the data segment does not belong to the predetermined data type.

13. The method of claim 6, wherein incrementally updating the data classification score includes:
   updating the data classification score incrementally for each of a plurality of additional data segments in the data stream based on whether each of the plurality of additional data segments is determined to be of the predetermined data type; and
   in response to the data classification score meeting a predetermined threshold, remediating the data stream as a leakage of sensitive data.

14. The method of claim 6, further comprising initiating a remedial action for data leakage when the data classification score meets a predetermined threshold.

15. The method of claim 6, wherein the predetermined data type includes at least one of a social security number, a credit card number, a telephone number, a bank account number, and a driver's license number.

16. A system comprising:
   a data set stored in a data store;

a validation scheme stored at a threat management facility, the validation scheme including a syntax and a validation algorithm for a predetermined data type; and
a sensitive data detection system configured by computer executable code stored at the threat management facility to perform the steps of:
receiving the data set from the data store;
identifying a data segment in the data set having the syntax of the predetermined data type;
performing an evaluation of whether the data segment belongs to the predetermined data type based on the validation algorithm; and
incrementally updating a data sensitivity score for the data set based on the evaluation of the data segment in the data set.

17. The system of claim 16, wherein the predetermined data type includes at least one of a social security number, a credit card number, a telephone number, a bank account number, and a driver's license number.

18. The system of claim 16, wherein the threat management facility stores a plurality of validation schemes for a plurality of sensitive data types, and wherein the sensitive data detection system is configured to check for each of the plurality of sensitive data types in the data store.

19. The system of claim 16, wherein the predetermined data type includes a date.

20. The system of claim 16, wherein the threat management facility is configured to remediate, based on the data sensitivity score, one or more endpoints in an enterprise network managed by the threat management facility.

* * * * *